Figure 1:
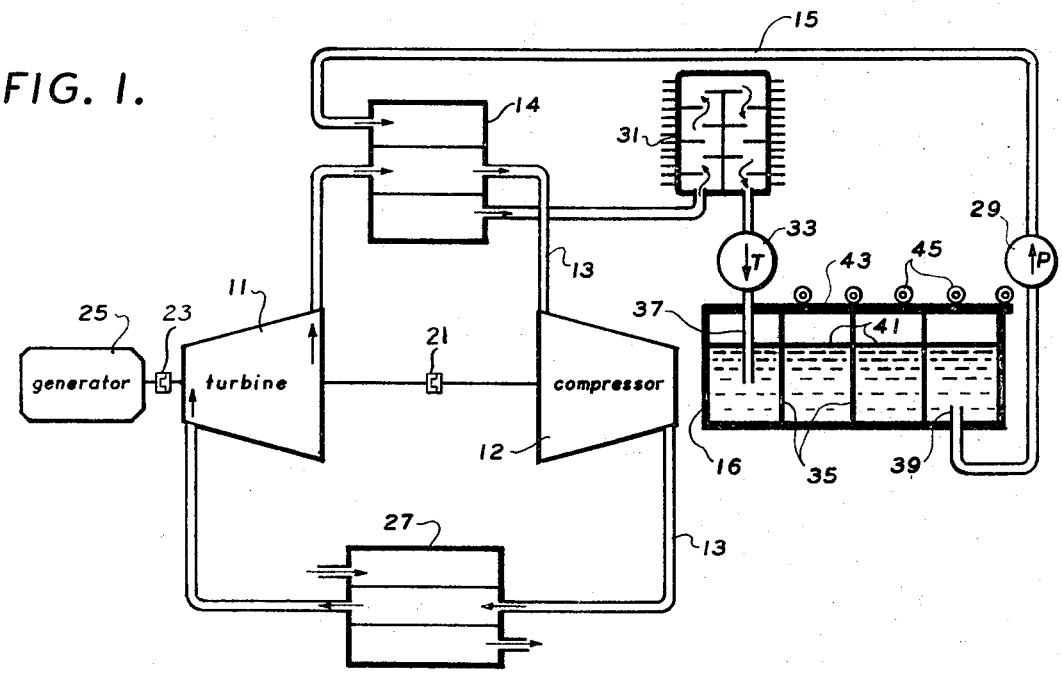

United States Patent [19]
Fortescue et al.

[11] 3,841,100
[45] Oct. 15, 1974

[54] CLOSED CYCLE GAS TURBINE SYSTEM

[75] Inventors: Peter Fortescue, La Jolla; Corwin L. Rickard, Rancho Santa Fe, both of Calif.

[73] Assignee: General Atomic Company, San Diego, Calif.

[22] Filed: Oct. 5, 1972

[21] Appl. No.: 295,300

[52] U.S. Cl. .................................. 60/690, 60/643
[51] Int. Cl. ........................................... F01k 25/00
[58] Field of Search .................. 60/36, 106, 49, 95; 261/151, 72 R

[56] References Cited
UNITED STATES PATENTS

| | | | |
|---|---|---|---|
| 1,390,516 | 9/1921 | Ehrhart | 60/95 R |
| 1,828,528 | 10/1931 | Fohl | 261/36 R UX |
| 2,414,521 | 1/1947 | Gunther | 259/DIG. 18 |
| 2,882,687 | 4/1959 | Stivender | 60/106 X |
| 3,257,806 | 6/1966 | Stahl | 60/38 X |
| 3,561,737 | 2/1971 | Braun | 261/72 R |
| 3,617,034 | 11/1971 | Skinner | 261/72 R |

*Primary Examiner*—Edgar W. Geoghegan
*Assistant Examiner*—H. Burks, Sr.
*Attorney, Agent, or Firm*—Fitch, Even, Tabin & Luedeka

[57] ABSTRACT

A closed cycle gas turbine system is described employing a heat exchanger for cooling the working gas after expansion in the turbine. A coolant circuit includes a delay reservoir having a capacity equal to the amount of coolant required by the heat exchanger over a substantial period of time, so that coolant flowing into the reservoir is not returned immediately to the heat exchanger.

11 Claims, 2 Drawing Figures

PATENTED OCT 15 1974          3,841,100

CLOSED CYCLE GAS TURBINE SYSTEM

This invention relates to closed cycle gas turbine systems and, more particularly, to an improved closed cycle gas turbine system suitable for a situation in which only dry air cooling is permissible on grounds of water conservation.

When combustion of fossil fuel is the only available heat source, the closed-cycle gas turbine requires a high temperature input heat exchanger. Where a gas-cooled nuclear reactor is used to supply the heat directly, the problem of providing this high temperature gas heat exchanger is avoided. In these circumstances the closed-cycle gas turbine offers a particularly attractive prospect for reduction of plant complication and cost.

Another significant feature of the closed-cycle gas turbine is that its necessary heat rejection is spread over a wide range of temperature, as opposed to that from a steam cycle, which is produced by the essentially constant temperature process of steam condensation.

As a result, very much lower quantities of coolant suffice to remove the same quantity of reject heat when a gas turbine is substituted for a steam plant, for this coolant may be permitted a much higher temperature change.

This invention relates to the closed-cycle gas turbine power generation system generally, whether the heat source be combustion of fossil fuel, or direct nuclear heating, but more particularly relates to adaptation of either arrangement to the situation in which only dry air cooling is permissible, as might be on grounds of water conservation.

The typical closed cycle gas turbine employs a number of turbine stages fed by gas from a high temperature heat source which drives one or more compressors, and an electric generator, which may or may not employ a common shaft.

Hot gas leaving this turbine may or may not be further usefully employed to preheat the gas flow entering the heat source by means of a recuperator. Even if the most effective possible such recuperator is used, the lowest temperature to which the working gas can be cooled by internal heat exchange must remain above that of the gas at the compressor delivery, which is generally of the order of 350°–400°F.

To complete the thermodynamic cycle, this temperature has to be further reduced in a precooler and then returned to the intake of the compressor. From this compressor, which may or may not employ interstage cooling, the gas passes, via the low temperature side of the recuperator, if such is used, back to the intake of the heat source.

The heat extracted from the precooler (and also from any intercoolers used), being at too low a temperature level for further internal use, has to be rejected to an external heat sink.

In the interest of both plant bulk and of efficiency, the effective temperature of this heat sink should be as low as possible.

Where atmospheric air is the only available heat sink, the plant performance is much influenced by the temperature of this atmosphere. In these circumstances, plant efficiency and output may be adversely influenced by a high ambient temperature. The result is that higher daytime temperatures mean poorer performance of the system than during the night. Since maximum electrical load usually occurs during the day, this situation is the reverse of what is most desirable.

It is an object of the present invention to provide an improved closed-cycle gas turbine system.

Another object of the invention is to provide a closed-cycle gas turbine system employing dry air cooling wherein the highest power and efficiency are available during daylight hours.

It is another object of the invention to provide a closed-cycle gas turbine system employing dry air cooling in which the effect of variation in ambient air temperature is minimized.

Figure 2:
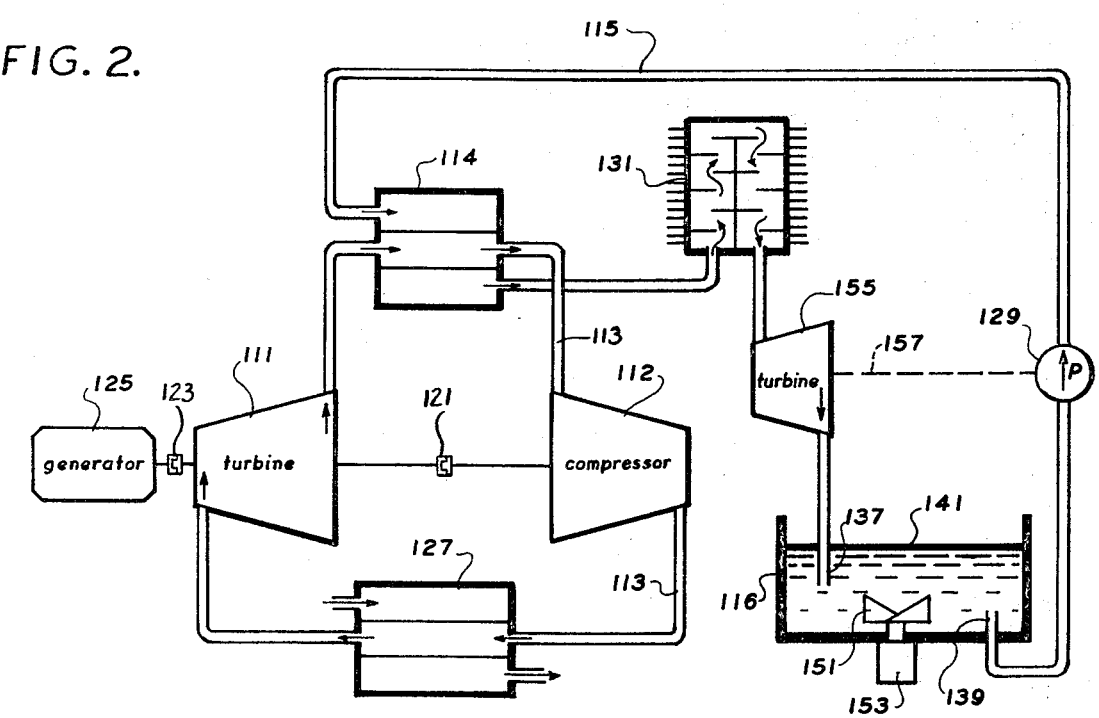

Other objects of the invention will become apparent to those skilled in the art from the following description, taken in connection with the accompanying drawings wherein:

FIG. 1 is a schematic view of a closed-cycle gas turbine system constructed in accordance with the invention; and FIG. 2 is a schematic view of an alternative embodiment of the invention.

In both cases, the case wherein intercoolers and recuperators are not used, is taken to illustrate the principles, in the simplest manner, the merit of the invention remaining whether or not such additions are used.

Very generally, the closed cycle gas turbine system of the invention comprises turbine means 11, compressor means 12, and means 13 for circulating a gas for expansion in said turbine means and compression in said compressor means. A heat exchanger 14 is provided for cooling the gas after expansion in the turbine means. A coolant circuit 15 is also provided for circulating a coolant through the heat exchanger. The coolant circuit includes a delay reservoir 16 having a capacity equal to the amount of coolant required by the heat exchanger over a substantial period of time.

Referring now more particularly to FIG. 1, the closed-cycle gas turbine system of the invention may be more clearly observed. In a closed-cycle gas turbine system, the absolute pressure of the working gas is relatively high and the working gas is recirculated, thereby reducing the dimensions of the compressor, turbine and piping. The basic closed-cycle installation includes a turbine 11 and a compressor 12, each of which may be single stage or multiple stage as desired. A shaft connection 21 or other suitable mechanical drive means couples the turbine 11 to the compressor 12. Similarly, a shaft connection 23 couples the turbine 11 to a generator 25 for producing electrical power. Completing the basic closed-cycle system are a heat source 27 and a precooler or heat exchanger previously described as 14.

In the compressor 12, the working gas, which may be air, hydrogen, helium, or some other gas, is increased from about 400 psia to about 1,000 psia. The high pressure gas is heated by the heat source 27, expanded in the turbine 11, and cooled back to the intitial temperature and pressure in the precooler 14. The precooler 14 is a heat exchanger with water circulation, with all heat being rejected to the water passing through the heat exchanger.

As previously mentioned, the coolant circuit 15 circulates a coolant, i.e., water through the heat exchanger 14. A pump 29 is provided for this purpose. After leaving the heat exchanger 14, the coolant water is passed to a dry cooling tower 31 and heat is removed from the water therein. The cooling water is then passed through a throttle 33 to atmospheric pressure and is passed into the delay reservoir 16.

The delay reservoir 16 is a large capacity water storage tank and functions to delay the return of coolant water to the heat exchanger 14. The tank 16 is provided with internal baffles 35 which discourage mixing of water entering the tank from the entry pipe 37 with water leaving the tank through the exit pipe 39.

The volume of the tank 16 is selected to be equal to the amount of coolant required by the heat exchanger 14 over a substantial period of time. More particularly, the volume of the tank is selected to provide a delay of about 12 hours, thus having a capacity sufficient to store the entire water of the plant's single daily flow. Since the water required in a typical closed-cycle gas turbine system is relatively low in volume, the tank volume need not be inconveniently large. Typically, a tank of about 440 square feet in area and 20 feet deep would be of sufficient size to accommodate the daytime flow of water from a 1,000 megawatt power station.

To eliminate evaporation of water stored in the tank, thus conserving water, the tank may be covered with a floating plastic film 41 or a roof 43, or both. To achieve the benefits of cooling by radiation, convection and conduction, particularly at night, the roof 43 may be made movable, such as by suitable rollers 45. In this way, the floating film 41 may be directly exposed to the night sky, while protecting it from sunlight during the day by moving the roof 43 into place as shown.

In operating the system of the invention, at the beginning of a day, the tank 16 is full of cool water produced by the night time conditions pertaining in the dry cooling tower 31. The volume of water in the tank 16 remains substantially constant at all times, but during the day, the return water entering the tank 16 from the dry cooling tower 31 is hotter than it is at night. By suitable baffling in the tank and by appropriate tank capacity, the advancing "hot front" of water does not reach the outlet pipe 39 for about 12 hours. Thus, during daytime operation, the cooler night time temperature cooling water is used to operate the heat exchanger 14. During night time operation, the hotter water produced by the daytime operation enters the outlet pipe 39 and is used in the heat exchanger 14. However, since the penalty for a resulting poor performance at night is much more acceptable than during the day, the lower power and lower efficiency are more tolerable. Thus, the system of the invention makes available the highest power and highest efficiency during daylight hours.

Referring now to FIG. 2, an alternative embodiment of the invention is shown. In FIG. 2, elements of the system having analogous structure and function to those elements of FIG. 1 have been given identical reference numerals, preceded by a 1. Thus, the system of FIG. 2 employs a turbine 111, a compressor 112, a generator 125, and suitable drive shafts or other connections 121 and 123. The system also employs a heater 127, means 113 for circulating a working gas from the compressor through the heater to turbine and back, and a suitable heat exchanger 114 for providing precooling.

As was the case in the previous embodiment, in the coolant circuit 115, coolant returning from the precooler 114 is passed through a dry cooling tower 131, and is discharged into a delay reservoir 116 through a discharge pipe 137. The reservoir 116 is provided with an outlet pipe 139, and water is recirculated through a pump 129. A floating plastic film 141 is provided to eliminate evaporation of the water from the tank.

In the embodiment of FIG. 2, the tank baffling is omitted and, instead, a stirrer or agitator 151 is provided, driven by a suitable motor 153 in order to stir or mix the contents of the tank 116. This maintains a relatively constant temperature throughout the tank. Thus, instead of interchanging night and daytime efficiency, the delay tank 116 serves to provide a mode of operation yielding constant performance at a mean level throughout both day and night.

In the embodiment of FIG. 2, the throttle is replaced by a water turbine 155. The water turbine is connected by suitable mechanical means 157 to drive the pump 129. This reduces the necessary power required of the pump 129 to repressurize the water supply. In this case, only the power losses require make up, improving efficiency of the overall system. Use of a water turbine, rather than a water throttle, whereby some of the necessary return pump power can be produced, is equally beneficial to the system described in the first embodiment.

Various other modes of operation are possible with either the system of FIGS. 1 or 2. For example, in the system of FIG. 1, the coolant water may be allowed to boil in the heat exchanger 14. The dry cooler 31 may then constitute a dry condensor. If heating of coolant is allowed to take place in the heat exchanger 14 to a sufficient degree as to produce dry saturated steam at, for example, 350 psi, the required water flow and the volume of the delay reservoir or tank 16 are reduced to only 30 percent of that previously mentioned for a 1,000 megawatt power station.

It may therefore be seen that the invention provides an improved closed-cycle gas turbine system in which a dry cooling tower or similar cooling means is employed and in which the effects of variations in ambient conditions are minimized.

Various modifications of the invention in addition to those shown and described herein will become apparent to those skilled in the art from the foregoing description and accompanying drawings. Such modifications are intended to fall within the scope of the appended claims.

What is claimed is:

1. A closed cycle gas turbine system comprising, turbine means, compressor means, means for circulating a gas for expansion in said turbine means and compression in said compressor means, a heat exchanger for cooling the gas after expansion in said turbine means, and a coolant circuit for circulating a coolant through said heat exchanger, said coolant circuit including a delay reservoir having a capacity equal to the amount of coolant required by said heat exchanger over a substantial period of time, said coolant circuit further including means for circulating coolant from said heat exchanger into said reservoir and from said reservoir to said heat exchanger.

2. A system according to claim 1 wherein the capacity of said delay reservoir is sufficient to provide a delay of about 12 hours.

3. A system according to claim 1 wherein said coolant circuit includes means for cooling the coolant after leaving said heat exchanger.

4. A system according to claim 3 wherein said cooling means comprises a dry cooling tower.

5. A system according to claim 3 wherein said cooling means comprise a dry condensor.

6. A system according to claim 1 wherein said coolant circuit includes a pump, and a turbine for driving said pump, said turbine being operable by said coolant.

7. A system according to claim 1 wherein said delay reservoir includes internal baffles arranged to inhibit thermal mixing of entry and exit flow.

8. A system according to claim 1 wherein said delay reservoir includes means for stirring the contents of said delay reservoir to maintain a relatively constant temperature throughout.

9. A system according to claim 1 including a moisture impermeable film covering the surface of coolant in said reservoir.

10. A system according to claim 1 including a movable opaque roof for selectively exposing said reservoir to ambient conditions.

11. A closed cycle gas turbine system comprising turbine means, compressor means, means for circulating a gas for expansion in said turbine means and compression in said compressor means, a heat exchanger for cooling the gas after expansion in said turbine means, and a coolant circuit for circulating a coolant through said heat exchanger, said coolant circuit including a storage tank having a capacity sufficient to store an amount of coolant equal to about 12 hours flow through said heat exchanger, means for cooling the coolant after leaving said heat exchanger and before entering said storage tank, and a pump for returning coolant from said storage tank to said heat exchanger.

* * * * *